(12) United States Patent
Fukaya et al.

(10) Patent No.: US 9,121,083 B2
(45) Date of Patent: Sep. 1, 2015

(54) COPPER RECOVERY APPARATUS AND COPPER RECOVERY METHOD

(71) Applicant: Kabushiki Kaisha Toshiba, Tokyo (JP)

(72) Inventors: Taro Fukaya, Tokyo (JP); Kenji Tsutsumi, Yokohama (JP); Atsushi Yamazaki, Tokyo (JP); Ichiro Yamanashi, Tokyo (JP); Hirofumi Noguchi, Sakai (JP); Yasutaka Kikuchi, Tokyo (JP); Shuji Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/477,988

(22) Filed: Sep. 5, 2014

(65) Prior Publication Data

US 2014/0377152 A1    Dec. 25, 2014

Related U.S. Application Data

(62) Division of application No. 13/187,858, filed on Jul. 21, 2011, now Pat. No. 8,834,715.

(30) Foreign Application Priority Data

Mar. 15, 2011    (JP) .................................. 2011-057130

(51) Int. Cl.
*B03C 1/01*      (2006.01)
*B03C 1/30*      (2006.01)
(Continued)

(52) U.S. Cl.
CPC ............ *C22B 15/0089* (2013.01); *B01D 37/02* (2013.01); *B03C 1/01* (2013.01);
(Continued)

(58) Field of Classification Search
CPC .............. B03C 1/01; B03C 1/30; B03C 1/32; B03C 2201/18; C02F 1/00; C02F 1/001; C02F 1/52; C02F 1/58; C02F 1/66; C02F 2101/20; Y10S 210/912
See application file for complete search history.

(56) References Cited

U.S. PATENT DOCUMENTS 8,911,631 B2 * 12/2014 Fukaya et al. ................ 210/223
8,986,541 B2 *  3/2015 Fukaya et al. ................ 210/202
(Continued)

FOREIGN PATENT DOCUMENTS

JP    52-129063    10/1977
JP    2006-122817    5/2006
(Continued)

OTHER PUBLICATIONS

Fukaya, U.S. Appl. No. 13/194,115, filed Jul. 29, 2011.
(Continued)

*Primary Examiner* — David A Reifsnyder
(74) *Attorney, Agent, or Firm* — Finnegan, Henderson, Farabow, Garrett & Dunner, LLP

(57) ABSTRACT

According to one embodiment, a copper recovery apparatus includes a precipitation tank configured to precipitate copper hydroxide grains in water, a filter aid supplier, a mixing tank configured to mix the filter aid with a water to produce a suspension, a separator provided with a filter, a line configured to supply the suspension to the separator, thereby forming a precoat layer formed of the filter aid on the filter, a separation tank configured to receive the detached matter of the precoat layer discharged together with the detaching water from the separator to magnetically separate copper hydroxide grains and filter aid, a line configure to discharge and recover the detaching water from the separation tank, and a line configured to return the separated filter aid to the filter aid supplier from the separation tank.

4 Claims, 3 Drawing Sheets

(51) Int. Cl.
*B03C 1/32* (2006.01)
*C02F 1/00* (2006.01)
*C02F 1/52* (2006.01)
*C02F 1/58* (2006.01)
*C02F 1/66* (2006.01)
*C22B 15/00* (2006.01)
*B01D 37/02* (2006.01)
*C02F 101/20* (2006.01)

(52) U.S. Cl.
CPC .. *B03C 1/30* (2013.01); *B03C 1/32* (2013.01); *C02F 1/00* (2013.01); *C02F 1/58* (2013.01); *C02F 1/66* (2013.01); *B03C 2201/18* (2013.01); *C02F 1/001* (2013.01); *C02F 1/52* (2013.01); *C02F 2101/20* (2013.01); *Y10S 210/912* (2013.01)

(56) References Cited

U.S. PATENT DOCUMENTS

| | | |
|---|---|---|
| 2009/0277843 A1 | 11/2009 | Fukaya et al. |
| 2010/0224566 A1 | 9/2010 | Fukaya et al. |
| 2010/0230358 A1 | 9/2010 | Fukaya et al. |
| 2012/0172215 A1 | 7/2012 | Fukaya et al. |
| 2012/0234768 A1 | 9/2012 | Fukaya et al. |
| 2012/0238003 A1 | 9/2012 | Fukaya et al. |
| 2012/0288435 A1 | 11/2012 | Fukaya et al. |
| 2012/0312727 A1 | 12/2012 | Fukaya et al. |

FOREIGN PATENT DOCUMENTS

| | | |
|---|---|---|
| JP | 2009-268976 | 11/2009 |
| JP | 2010099575 | 5/2010 |
| JP | 2010-207680 | 9/2010 |
| JP | 2010-207760 | 9/2010 |
| JP | 2011-046787 | 3/2011 |
| WO | WO 2011-004431 | 1/2011 |

OTHER PUBLICATIONS

Fukaya, U.S. Appl. No. 13/197,361, filed Aug. 3, 2011.
First Office Action From the Japanese Patent Office in counterpart Japanese Patent Application No. 2012-036378 mailed Jun. 30, 2015.

* cited by examiner

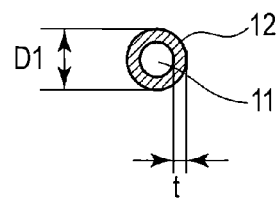
F I G. 3A
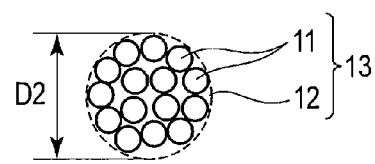
F I G. 3B
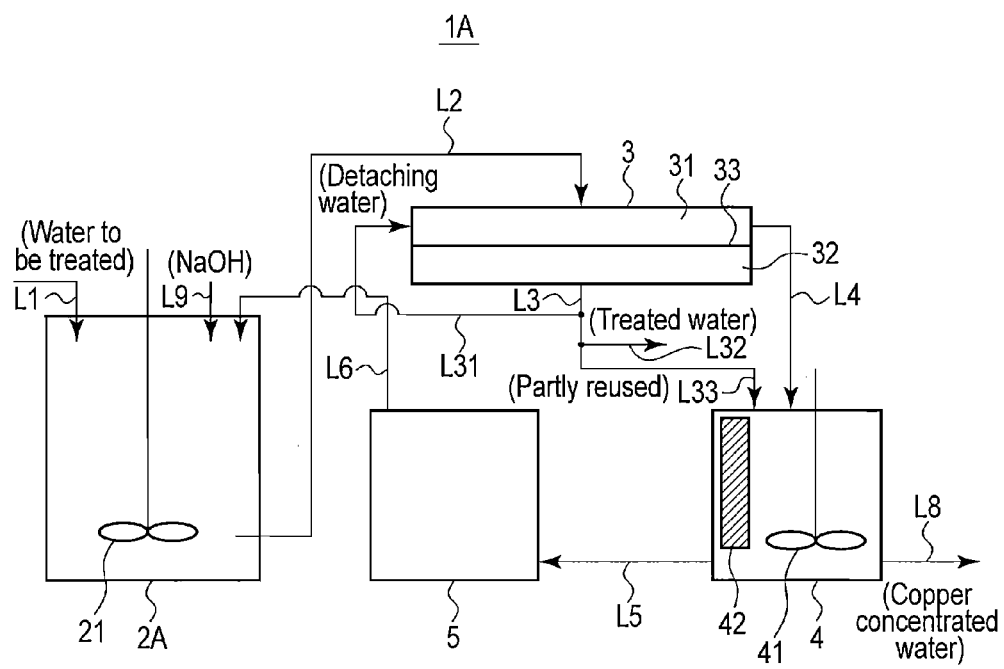
F I G. 4

COPPER RECOVERY APPARATUS AND COPPER RECOVERY METHOD

CROSS-REFERENCE TO RELATED APPLICATIONS

This application is a divisional of application Ser. No. 13/187,858, filed Jul. 21, 2011, now issued as U.S. Pat. No. 8,834,715 B2, which is incorporated herein by reference.

This application is based upon and claims the benefit of priority from prior Japanese Patent Application No. 2011-057130, filed Mar. 15, 2011, the entire contents of which are incorporated herein by reference.

FIELD

Embodiments described herein relate generally to a copper recovery apparatus and a copper recovery method for recovering copper existing in water.

BACKGROUND

Nowadays, there are increased needs for effective use of water resources due to industrial developments and rise in population. For this, it is important to reuse wastewater such as industrial wastewaters. In order to reuse wastewater, it is necessary to refine water, that is, to separate foreign substances from water. As the method of separating foreign substances from water, there are various methods such as the membrane separation method, centrifugal separation method, activated carbon adsorption method, ozone treatment method and method of removing floating substances by coagulation. Removal of substances, which have a large influence on the environment, such as phosphorous and nitrogen contained in water and removal of oils and clay dispersed in water can be accomplished by using these methods.

Among these various water treating methods, the membrane separation method is one of the methods which are most usually used to remove insoluble substances in water. In this case, a filter aid is used in the membrane separation method from the viewpoint of protection of membrane and the viewpoint of raising the flow rate of water containing substances which can be hardly dehydrated.

On the other hand, as a method of removing harmful substances and valuable materials in water, a method is known in which substances dissolved in water are allows to undergo a given reaction to precipitate the substances, followed by solid-liquid separation. In conventional methods, copper ions are precipitated from water by a reaction and a polymer having an aggregation function is added to thereby aggregate the copper precipitate by the polymer, thereby separate and recover copper as a copper precipitate/polymer aggregate.

However, in the conventional method, the recovered copper precipitate/polymer aggregate itself contains a lot of polymer, and there is therefore the problem concerning a low copper purity per unit volume of the aggregate and hence a low copper recovery efficiency. Also, there is the problem that the amount of sludge (residue) left after copper is separated from the aggregate is large, resulting in increased amount of waste material, because the sludge is finally disposed of as waste material.

BRIEF DESCRIPTION OF THE DRAWINGS

FIG. 3A is a schematic sectional view showing magnetic particles coated with a polymer, FIG. 3B is a schematic sectional view showing an aggregate produced by aggregation of magnetic particles;

FIG. 4 is a structural block diagram illustrating a copper recovery apparatus according to a second embodiment;

DETAILED DESCRIPTION

Figure 1:
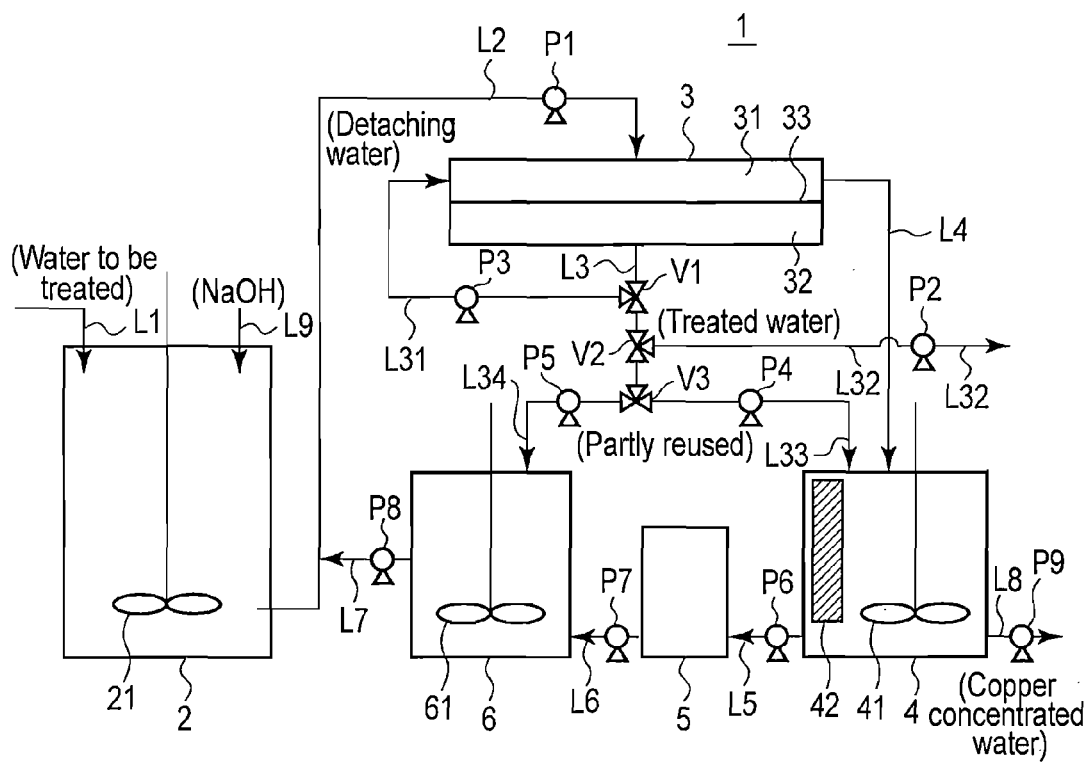
FIG. 1 is a structural block diagram showing a copper recovery apparatus according to a first embodiment.

The embodiment has made various experiments as to direct solid-liquid separation of a copper precipitate in wastewater by using a filter membrane and have made various studies based on these experiments, and as a result, found that it is difficult to filter the copper precipitate directly because the grain diameter of (initial diameter) of the copper precipitate precipitated from wastewater is too small. Embodiments described herein are made based on this finding.

Various embodiments will be described hereinafter with reference to the accompanying drawings.

(1) A copper recovery apparatus of the embodiment, comprises: (A) a precipitation tank 2 configured to render water to be treated containing copper ions alkaline to precipitate copper hydroxide grains in the water; (B) a filter aid supply unit 5 configured to supply a filter aid constituted of single particles comprising a magnetic substance or aggregates of the particles and having an average diameter of 0.5 μm to 20 μm; (C) a mixing tank 6 configured to mix the filter aid fed from the filter aid supply unit with a dispersion medium to produce a suspension of the filter aid in the dispersion medium; (D) a solid-liquid separator 3 provided with a filter dividing the inside space thereof into an upper space and a lower space; (E) a suspension supply line L7, L2 configured to supply the suspension from the precipitation tank to the upper space of the solid-liquid separator, the suspension being filtered by the filter, thereby forming a precoat layer formed of the filter aid on the filter; (F) a water supply line L2 configured to supply the water containing the copper hydroxide grains to the solid-liquid separator from the precipitation tank to pass the water through the precoat layer and the filter, thereby trapping the copper hydroxide grains by the precoat layer and providing the filtrate to the lower space; (G) a detaching water supply line L31, L11 configured to supply a detaching water that detaches the precoat layer trapping the copper hydroxide grains from the filter, to the upper space of the solid-liquid separator to make the detaching water to detach the precoat layer from the filter; (H) a separation tank 4 configured to receive the detached matter of the precoat layer discharged together with the detaching water from the upper space of the solid-liquid separator, and magnetically separate the copper hydroxide grains and the filter aid contained in the detached matter; (I) a copper recovery line L8 configure to discharge and recover the detaching water containing the separated copper hydroxide grains from the separation tank; and (J) a filter aid return line L5 configured to return the separated filter aid to the filter aid supply unit from the separation tank.

Figure 6:
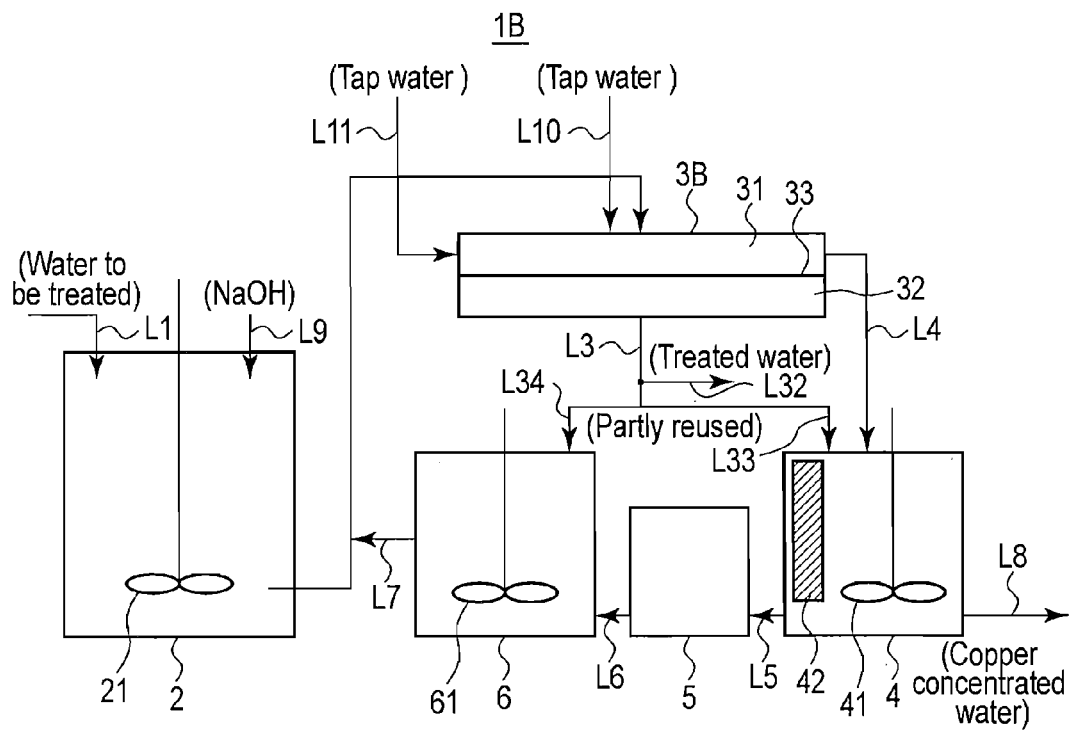
FIG. 6 is a structural block diagram illustrating a copper recovery apparatus according to a third embodiment.

In the case of using this apparatus in the precoating process, according to the embodiment described herein, copper hydroxide grains and filter aid are separated from a detached matter of the precoat layer in the separation tank and the separated copper hydroxide grains are recovered, while the separated filter aid is returned to the filter aid supply unit through a filter aid return line and the returned filter aid can be reused in the filter aid-supply unit (FIG. 1 and FIG. 6). Since the filter aid and copper hydroxide grains are directly separated from the detached matter of the precoat layer in the separation tank in this manner, copper purity per unit volume of the recovery product is increased, leading to improved copper recovery efficiency. Also, because the separated filter aid can be reused repeatedly, treating cost is reduced. In this case, the copper hydroxide here includes not only copper (II) hydroxide but also complex salts or mixed salts containing copper hydroxide. Examples of the copper hydroxide include combinations of copper carbonate and copper hydroxide and combinations of copper sulfate and copper hydroxide.

(2) In the apparatus of the above (1), it is preferable that the filter aid is constituted of aggregates of magnetic particles each of which surfaces is coated with a polymer, the average diameter $D1$ of the magnetic particles is within a range of 0.5 µm to 20 µm, the average diameter $D2$ of the aggregates satisfies the equation $D1<D2\leq20$ µm and the average coating thickness $t$ of the polymer satisfies the equation $0.01\leq t\leq0.25$ µm (FIG. 3).

In the embodiment described herein, the average diameter $D1$ of the magnetic particles is made to fall in a range of preferably 0.5 µm to 20 µm, and more preferably 0.5 µm to 15 µm. When the average diameter of the magnetic particles is less than 0.5 µm, the particles are aggregated too closely and hence the distance between particles is too short, making difficult to obtain effective quantity of water flow. When the average diameter $D1$ exceeds 20 µm on the other hand, particles are aggregated coarsely and hence the distance between particles is too long, resulting in significant reduction in the efficiency of recovery of copper hydroxide grains precipitated in water. Moreover, when the average diameter $D1$ is made to be 15 µm or less, the efficiency of recovery of copper hydroxide grains is more improved. In the meantime, the inventors of the embodiments have made a demonstration test to thereby obtain such a finding that effective copper recovery efficiency cannot be attained when the average diameter $D1$ of the magnetic particles is, for example, 26 µm. It is also understood from this fact that when the average diameter $D1$ of the magnetic particles is too large, copper recovery efficiency is dropped.

In the embodiment described herein, the average diameter $D2$ of an aggregates of magnetic particles preferably satisfies the equation $D1<D2\leq20$ µm and more preferably satisfies the equation $D1<D2\leq15$ µm. When the average diameter $D2$ of the aggregates as the filter aid exceeds 20 µm, fine precipitates in water are allowed to easily pass as mentioned above, bringing about a deterioration in the copper hydroxide grain-trapping efficiency of the filter aid. When the average diameter $D2$ is designed to be 15 µm, the copper hydroxide grain-trapping efficiency of the filter aid is more improved as mentioned above.

In the embodiment described herein, the average coating thickness $t$ of the polymer preferably satisfies the equation $0.01\leq t\leq0.25$ µm and more preferably satisfies the equation $0.01\leq t\leq0.15$ µm. When the average coating thickness $t$ of the polymer is less than 0.01 µm, not only a desired coating effect is not obtained but also the aggregates as the filter aid is dropped in strength and the filter aid cannot be therefore used. When the coating thickness $t$ exceeds 0.25 µm on the other hand, clearances between magnetic particles in the aggregate as the filter aid are filled with a resin, and therefore, not only the flow rate of the water to be treated is dropped but also the aggregates is reduced in irregularities, with the result that the copper hydroxide grain-trapping efficiency of the filter aid tends to be dropped. When the coating thickness $t$ is designed to be 0.15 µm or less, the aggregates has proper irregularities, which improves the copper hydroxide grain-trapping performance so that the flow rate of the water to be treated is increased, resulting in more improvement in copper recovery efficiency.

(3) In the apparatus of the above (1), it is preferable that the apparatus further comprises a washing water supply line L10 communicated with the upper space of the solid-liquid separator to supply tap water to the upper space 31 to remove cations from the precoat layer on the filter (FIG. 6).

According to the embodiment described herein, cations (Na ions, Ca ions, Mg ions and the like) contained in the precoat layer can be removed efficiently by introducing an abundant amount of tap water into the upper space of the solid-liquid separator through the washing water supply line L10.

(4) In the apparatus of the above (1), it is preferable that the detaching water supply line L31 is communicated with a side of the upper space 31 of the solid-liquid separator to supply tap water via the detaching water supply line L31 as the detaching water to the upper space from the side (FIG. 6).

According to the embodiment described herein, tap water having sufficient amount and pressure is introduced into the upper space of the solid-liquid separator from the side through the detaching water supply line to thereby detach off the precoat layer from the filter and to decompose the precoat layer into pieces by water pressure. If, in this case, an injection nozzle is attached to the connecting part of the detaching water supply line L31 and the solid-liquid separator 3 to inject detaching water forcedly from the nozzle, the effect of detaching the precoat layer from the filter is improved.

(5) A copper recovery apparatus of the embodiment, comprises: (a) a mixing/precipitation tank 2A configured to render water to be treated containing copper ions alkaline to precipitate copper hydroxide grains in the water and to produce a suspension by mixing a filter aid constituted of single particles comprising a magnetic substance or aggregates of the particles and having an average diameter of 0.5 µm to 20 µm with the water containing the precipitated copper hydroxide grains; (b) a filter aid supply unit 5 configured to supply the filter aid to the mixing/precipitation tank; (c) a solid-liquid separator 3 provided with a filter dividing the inside space thereof into an upper space and a lower space; (d) a suspension supply line L12 configured to supply the suspension from the mixing/precipitation tank to the upper space of the solid-liquid separator, the suspension being filtered by the filter, to form a deposit layer containing the filter aid and the copper hydroxide grains on the filter; (e) a detaching water supply line L21, L11 configured to supply a detaching water that detaches the deposit layer from the filter, to the upper space of the solid-liquid separator to make the detaching water to detach the deposit layer from the filter; (f) a separation tank 4 configured to receive the detached matter of the deposit layer discharged together with the detaching water from the upper space of the solid-liquid separator, and magnetically separate the copper hydroxide grains and the filter aid contained in the detached matter; (g) a copper recovery line L8 configure to discharge and recover the detaching water containing the separated copper hydroxide grains from the separation tank; and (h) a filter aid return line L5 configured to return the separated filter aid to the filter aid supply unit from the separation tank.

According to the embodiment described herein, the copper hydroxide grains and filter aid are separated from a detached matter of the copper hydroxide grains/filter aid mixture deposit layer in the separation tank and the separated copper hydroxide grains are recovered, while the separated filter aid is returned to the filter aid supply unit through the filter aid return line and the returned filter aid can be reused in the filter aid supply unit when the apparatus is used in the body feed process (FIG. 4). Since the filter aid and copper hydroxide grains are directly separated from the detached matter of the deposit layer in the separation tank in this manner, copper purity per unit volume of the recovered material is improved, leading to an improvement in copper recovery efficiency. Also, because the separated filter aid can be reused repeatedly, the process cost is reduced.

(6) In the apparatus of the above (5), it is preferable that the filter aid is constituted of an aggregate obtained by aggregating magnetic particles, a surface of the magnetic particles being coated with a polymer, the average diameter D1 of the magnetic particles is in a range of 0.5 to 20 μm, the average diameter D2 of the aggregates satisfies the equation $D1<D2\leq 20$ μm and the average coating thickness t of the polymer satisfies the equation $0.01 \leq t \leq 0.25$ μm (FIG. 3).

In the embodiment described herein, the same action effect as the above (2) is obtained.

(7) A copper recovery method of the embodiment, comprises: (a) rendering water to be treated containing copper ions alkaline state to precipitate copper hydroxide grains in the water; (b) mixing a filter aid constituted of single particles comprising a magnetic substance or aggregates of the particles and having an average diameter of 0.5 to 20 μm, with the dispersion medium to produce a suspension of the filter aid in the dispersion medium; (c) filtering the suspension by a filter, thereby forming a precoat layer formed of the filter aid on the filter; (d) supplying the water containing the copper hydroxide grains on the filter to pass the water through the precoat layer and the filter, thereby trapping the copper hydroxide grains contained in the water by the precoat layer; (e) supplying a detaching water that detaches the precoat layer trapping the copper hydroxide grains from the filter, to the precoat layer on the filter, to detach the precoat layer trapping the copper hydroxide grains from the filter by the detaching water, thereby to provide a mixture of the detached matter of the precoat layer and the detaching water; (f) magnetically separating the filter aid from the copper hydroxide grains in the mixture; and (g) recovering the detaching water containing the separated copper hydroxide grains, and reusing the separated the filter aid in the (b).

Figure 2:
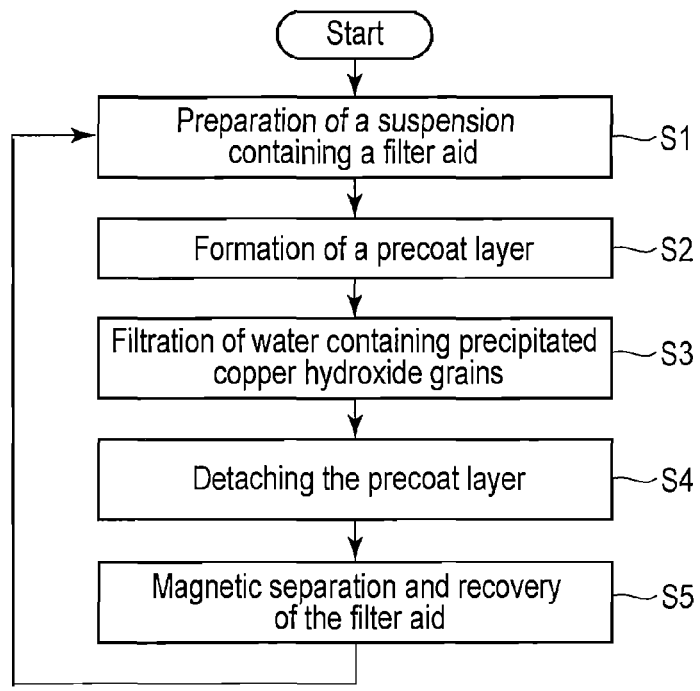
FIG. 2 is a process diagram showing a copper recovery method according to the precoating process using an apparatus of FIG. 1.

In the embodiment described herein, the same action effect as the above (1) is obtained (FIG. 2, FIG. 1 and FIG. 6).

(8) A copper recovery method of the embodiment, comprises: (i) rendering water to be treated containing copper ions alkaline state to precipitate copper hydroxide grains in the water; (ii) mixing a filter aid constituted of single particles comprising a magnetic substance or aggregates of the particles and having an average diameter of 0.5 μm to 20 μm, with the water to produce a suspension of the filter aid and the copper hydroxide grains in the dispersion medium; (iii) filtering the suspension by a filter to form a deposit layer containing the filter aid and the copper hydroxide grains on the filter; (iv) supplying a detaching water that detaches the deposit layer from the filter, to the deposit layer on the filter, to detach the deposit layer from the filter by the detaching water, thereby to provide a mixture of detached matter of the deposit layer and the detaching water; (v) magnetically separating the filter aid from the copper hydroxide grains in the mixture; and (vi) recovering the detaching water containing the separated copper hydroxide grains, and reusing the separated filter aid in the (ii).

Figure 5:
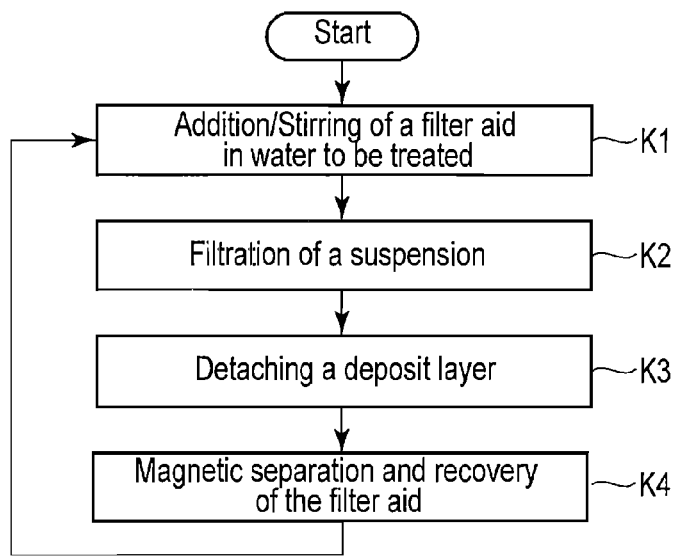
FIG. 5 is a process diagram showing a copper recovery method according to the body feed process using an apparatus of FIG. 2.

In the embodiment described herein, the same action effect as the above (1) is obtained (FIG. 5 and FIG. 4).

Various preferred embodiments will be explained with reference to the appended drawings.

In embodiments and Examples described below, an aqueous alkali solution is directly poured into water containing copper ions for example, an aqueous copper sulfate solution, to precipitate copper hydroxide grains in the water to be treated. Although no particular limitation is imposed on the type of alkali, sodium hydroxide is most suitable. Generally, such direct pouring of an aqueous alkali solution reduces the grain size of copper compound grains precipitated in water to be treated and it is difficult to separate the copper compound grains from the water. However, when the method according to the embodiment described herein is used, these fine copper compound grains (average grain diameter: 0.01 to 10 μm) can be separated and recovered and therefore, the number of steps is reduced and the apparatus is simplified with ease.

As the method of using a filter aid in the embodiment described herein, there are the precoating process and body feed process. The apparatus used in the precoating process is different in a part of the structure from the apparatus used in the body feed process, and therefore, each apparatus will be explained.

(Copper Recovery Apparatus in a First Embodiment)

First, a copper recovery apparatus in a first embodiment will be explained with reference to FIG. 1.

A copper recovery apparatus 1 in the first embodiment is an apparatus used in the precoating process and particularly in the case where the concentration of a copper compound grains precipitated in water to be treated is low. The copper recovery apparatus 1 is provided with a precipitation tank 2, a solid-liquid separator 3, a separation tank 4, filter aid tank 5, mixing tank 6, and a raw water supply source, an alkali feeder and a copper concentrated water reservoir which are not shown, and these devices and apparatuses are communicated with each other through a plurality of pipe lines L1-L8. These pipe lines L1-L8 are equipped with various types of pumps P1-P9, valves V1 to V3 and measuring instruments and sensors though not shown. Detection signals are input to, an input section of a controller (not shown) from these instruments and sensors and control signals are output to these pumps P1 to P9 and valves V1 to V3 from an output section of the controller to thereby control the actions of these pumps and sensors. The copper recovery apparatus 1 is so designed that the whole apparatus is controlled overall by a controller (not shown).

The precipitation tank 2 is provided with a stirring screw 21 that stirs water to be treated and serves to precipitate copper ions contained in water, as copper compound grains in such a manner that copper-containing industrial wastewater which is to be the water is introduced thereinto from a raw water supply source (not shown) through a line L1 and an appropriate amount of sodium hydroxide (NaOH) is poured thereinto through a line L9 from an alkali feeder which is not shown while the water to be treated is temporarily stored.

The solid-liquid apparatus 3 is provided with a built-in filter 33 which divides the inside space into an upper space 31 and a lower space 32. As the filter 33, a fabric made of polymer fibers such as polyester, nylon, polypropylene, fluoro-fibers, or cellulose acetate woven by plain weaving, twill weaving, double weaving, or the like may be used. The thickness of the filter is about 1 mm or less and the sieve opening of the filter is about 1 to 20 μm.

The upper space 31 of the solid-liquid separator is communicated with the precipitation tank 2 through the water supply line L2 provided with a pressure pump P1. Also, a detaching water supply line L31 provided with a pump P5, and detached-removing material discharge line L4 are respectively communicated with the side of the upper space 31.

On the other hand, the lower space 32 of the solid-liquid separator is communicated with a water pipe line L3 provided with 3 three-way valves V1, V2 and V3. The aforementioned detaching water supply line L31 is branched at the first three-way valve V1 from the water pipe line L3. A filtered water line L32 provided with a pump P2 is branched at the second three-way valve V2 from the water pipe line L3. Two lines L33 and L34 are respectively branched at the third three-way valve V3 from the water pipe line L3. One branched line L33 is provided with a pump P4 and communicated with a separation tank 4 which will be explained later. Other branched line L34 is provided with a pump P5 and communicated with a mixing tank 6 which will be explained later.

The separation tank 4 is provided with a stirring screw 41 that stirs detached-removing material discharge water received from the upper space 31 of the solid-liquid separator through the detached-removing material discharge line L4 and is also provided with a built-in electromagnet 42 that separates precipitated copper compound grains (mainly, copper hydroxide grains) from the filter aid. The electromagnet 42 is connected to a power source (not shown) which is on/off-controlled by a controller (not shown).

Besides the detached and removing material discharge line L4, the branched line L33 branched from the water pipe line L3 is communicated with the upper part of the separation tank 4 and it is so devised that a part of the water which passes through the filter 33 of the solid-liquid separator is supplied to the separation tank 4 and is utilized to dilute the filter aid partially separated from the water in the separation tank 4. On the other hand, a copper concentrated water recovery line L8 and a filter aid return line L5 are respectively communicated with the lower part of the separation tank 4. The copper concentrated water recovery line L8 is provided with a pump P9 and serves as a pipe line for recovering copper concentrated water to a reservoir (not shown) from the separation tank 4. The filter aid return line L5 is provided with a pump P6 and serves as a pipe line for returning the filter aid separated from the separation tank 4 to the filter aid tank 5.

The filter aid tank 5 is so devised that filter aid is supplied thereto from a filter aid supply source (not shown) and also, the filter aid separated from the separation tank 4 is returned thereto through the aforementioned filter aid return line L5. Also, the filter aid tank 5 is so devised that an appropriate amount of the filter aid is supplied to the mixing tank 6 through a filter aid-supply line L6 provided with a pump P7.

The mixing tank 6 is provided with a stirring screw 61 that stirs a dispersion medium (suspension) containing the filter aid to add the dispersion medium to the filter aid supplied from the filter aid tank 5 via the line L6, followed by stirring to mix, thereby producing a suspension containing the filter aid. Water is preferably used as the dispersion medium. The branched line L34 branched from the water pipe line L3 is communicated with the upper part of the mixing tank 6, a part of the water which passes through the filter 33 of the solid-liquid separator is supplied to the mixing tank 6 such that the part of the water is utilized as the dispersion medium in the mixing tank 6.

Also, a suspension supply line L7 provided with a pump P8 is communicated with an adequate position of the mixing tank 6. The suspension supply line L7 is communicated with an adequate position of the water supply line L2. The suspension is flowed into the line L2 from the mixing tank 6 through the line L7 by driving the pump P8 and supplied to the upper space 31 of the solid-liquid separator 3 at a specified pressure by driving the pressure pump P1. In this case, a flow control valve (not shown) controlled by a controller (not shown) is installed in the suspension supply line L7 to control the feed flow rate of the slurry-like suspension.

In this case, the suspension adjusted in the mixing tank 6 may be supplied to the solid-liquid separator 3 from the mixing tank 6 through the lines L7 and L2 either as it is or after the suspension from the mixing tank 6 is made to join the water from the precipitation tank 2 to dilute the suspension with the water. In the latter case, the water to be treated is utilized as a dilution solvent used to dilute the slurry-like suspension. A controller (not shown) controls flow rate control valve and both pumps P8 and P1 such that the suspension supplied to the solid-liquid separator 3 has an adequate concentration in any case.

(Copper Recovery Method in the First Embodiment)

Next, a copper recovery method in the first embodiment using the above apparatus 1 will be explained with reference to FIG. 2 and FIG. 1.

Water is introduced into the mixing tank 6 as a dispersion medium, to which a specified amount of the filter aid is added and poured and the stirring screw 61 is rotated to stir the mixture to prepare a suspension containing a desired filter aid (Step S1). The filter aid may be one containing magnetic particles and further containing a polymer used to coat the magnetic particles. Although water is primarily used as the dispersion medium, other dispersion mediums (for example, an aqueous alcohol solution) may be optionally used. The concentration of the filter aid in the suspension is adjusted to, for example, about 10000 to 200000 mg/L, though no particular limitation is imposed on it insofar as the precoat layer can be formed by the following procedures.

Then, the pumps P8 and P1 are driven to supply the suspension to the solid-liquid separator 3 from the mixing tank 6 through the suspension supply lines L7→L2 to separate the filter aid from the suspension by the filter 33. A precoat layer made of the filter aid is thereby formed on the filter 33 (Step S2). In this case, the suspension is supplied under a specified pressure to the filter 33 by using the pressure pump P1.

The filter 33 is installed in such a manner as to close the intake port of the solid-liquid separator 3 so that a reduction in the pressure of the suspension in the solid-liquid separator 3 is reduced as much as possible to allow the filter 33 to undergo the filtering of the suspension. Specifically, the upper space 31 defined by the container wall of the solid-liquid separator 3 and the filter 33 is decreased and a high-pressure suspension is pressed in the narrowed space having a small volume to thereby promote the ability of the filter 33 to carry out solid (filter aid) and liquid separation. At this time, a liquid component of the suspension rapidly passes through the filter 33 by the synergetic action of the pressure applied by driving the pressure pump P1 and gravitation and a solid component (filter aid) of the suspension is trapped by the filter 33, with the result that a precoat layer made of the filter aid is formed on the filter 33. The thickness of the precoat layer is about 0.5 to 10 mm though depending on the concentration of the prepared suspension.

On the other hand, the copper ion-containing water is introduced into the precipitation tank 2, to which is added sodium hydroxide (NaOH) to alkalinize the water to be treated to precipitate copper compound grains primarily made of copper hydroxide from the water in the precipitation tank 2.

It is estimated that the copper hydroxide precipitation reaction is given by the following formula (1).

$$Cu^{2+} + 2NaOH \rightarrow Cu(OH)_2 \downarrow (\text{precipitated}) + 2Na^+ \qquad (1)$$

However, when the aqueous solution is acidic, the precipitate (copper hydroxide grains) of copper hydroxide obtained according to the above formula (1) reacts with an acid as given by the following formula (2) and is dissolved, with the result that copper hydroxide grains are not obtained. Also, because the number of hydroxide groups is small in a neutral region, the reaction given by the above formula (1) is not promoted, with the result that copper hydroxide grains are not obtained. The generation of precipitates of copper hydroxide grains in the aqueous solution is not observed until the pH of the aqueous solution falls in an alkali region. When the aqueous solution is in an alkali state, copper hydroxide grains stably precipitate from the aqueous solution according to the above formula (1).

$$Cu(OH)_2 + H_2SO_4 \rightarrow CuSO_4 + 2H_2O \qquad (2)$$

The water containing copper compound grains precipitated in this manner is fed under pressure to the solid-liquid separator 3 from the precipitation tank 2 through the line L2 by driving the pressure pump P1 to filter the water by the filter 33 and precoat layer (Step S3). At this time, copper compound grains in the water to be treated are trapped by the filter aid in the precoat layer.

The water to be passed through the precoat layer on the filter 33 is supplied primarily under pressure. At this time, the copper hydroxide grains are adsorbed to the surface of the filter aid in the precoat layer, whereby they are separated and removed from the water. At this time, the copper hydroxide grains can be efficiently trapped and sufficient water flow rate can be obtained by designing the filter aid having a specific structure as will be explained later.

Then, the valve V1 is switched to start the pump P3 and the pump P3 is driven to return a part or all of the treated water to the upper space 31 of the solid-liquid separator through the lines L3→L31. This treated water to be returned is used as detaching water that detach s the precoat layer from the filter 33. The treated water (detaching water) is blasted against the precoat layer from the side of the upper space 31 to detach the precoat layer from the filter 33 and the treated water is further blasted against the detached matters to decompose the detached matters into pieces, thereby dispersing the filter aid and copper compound grains in a dispersion medium (Step S4).

The detaching of the precoat layer may be carried out either in the container with a filter installed therein or in other container. When the precoat layer is detached/decomposed in the other container, the precoat layer is decomposed into pieces by using, for example, a jet nozzle and then, transported. When the treated water is insufficient, water may be replenished to the line L31 from other sources. Although water is preferably used for the detaching of the precoat layer, a surfactant or organic solvent may be used to detach/decompose the precoat layer.

The suspension containing the decomposed materials of the precoat layer is fed to the separation tank 4 from the upper space 31 through the line L4, the decomposed material of the precoat layer is stirred by the stirring screw 41 in the separation tank 4 to further decompose the decomposed material into pieces at a grain level to disperse the filter aid and copper compound grains. If this stirring is satisfactorily performed, the filter aid and copper compound grains are more uniformly dispersed, making it easy to separate the filter aid.

Then, the filter aid is recovered from the suspension obtained after the detaching of the precoat layer by the magnetic separation method (Step S5). Although no particular limitation is imposed on a method of magnetic separation, examples of the magnetic separation method include a recovery method in which a permanent magnet or electromagnet is placed in the container of the separation tank 4, a recovery method in which a wire net or the like magnetized by a magnet is used to recover and then, the magnetic field is turned OFF to thereby recover the grains, and the like. Specifically, an electromagnet 42 is turned ON to adsorb and secure the filter aid by the electromagnet 42 in the suspension. Then, the copper concentrated water is discharged in a reservoir (not shown) from the container of the separation tank 4 through the line L8. Then, the electromagnet 42 is turned OFF to make the filter aid fall away from the electromagnet 42, a part of the treated water is supplied to the container from the solid-liquid separator 3 through the line L32 to add the treated water to the fallen filter aid to make it into a slurry-like or suspension-like material, and this slurry-like or suspension-like filter aid is fed to the filter aid supply unit 5 from the separation tank 4 through the line L5. Otherwise, after the filter aid is adsorbed and secured by the electromagnet 42, the filter aid together with the electromagnet 42 may be transferred to other container, where the electromagnet 42 is turned OFF to thereby make the filter aid fall away from the electromagnet 42, thereby recovering the filter aid in the other container.

Thereafter, the recovered filter aid is supplied to the upper space 31 of the solid-liquid separator 3 from the filter aid supply unit 5 through the line L6 to reuse the recovered filter aid for forming the precoat layer. The filter aid can be used repeatedly in the cycle of formation of a precoat layer→trapping of copper compound grains→solid-liquid separation→recovery→formation of a precoat layer.

In the method of the first embodiment, the precoat layer is formed in advance on the filter 33 and then, wastewater is supplied. Therefore, the amount of copper compound grains adsorbed to the surface of the filter aid is increased with treating time. As a result, particularly copper compound grains excessively adsorbed to the surface of the filter aid fill the clearances between the filter aids and therefore, the flow rate of the water to be treated is dropped. Therefore, the method of the first embodiment is effective when the concentration of copper compound grains in water is low as mentioned above.

(Filter Aid)

Next, the filter aid will be explained in detail.

As the filter aid, those containing magnetic particles which have an average particle diameter range from 0.5 to 20 µm are used. The filter aid may be single particles containing magnetic substance or may be the one in which a surface of magnetic particles 11 is coated with a coating resin 12 such as a polymer as shown in FIG. 3A. Also, the filter aid may be an aggregate 13 obtained by aggregation of the primary particles 10 coated with a polymer as shown in FIG. 3B.

The filter aid preferably has the characteristics that the average diameter D1 of the primary particles 10 is 0.5 to 20 µm, a part of these primary particles are aggregated by a polymer or trialkoxysilane, the average diameter D2 of the aggregates satisfies the equation D1<D2≤20 µm and the coating thickness t of the polymer desirably satisfies the equation 0.01≤t≤0.25 µm. Here, the average diameter is measured by the laser diffraction method. Specifically, the average diameter can be measured, for example, by a measuring device (trade name: SALD-DS21, manufactured by Shimadzu Corporation). When the average diameter of the primary particles exceeds 20 µm, the distance between particles becomes too large and there is therefore the case where these primary particles allow fine precipitates contained in water to pass through as will be explained later. When the primary particle diameter is less than 0.5 µm, on the other hand, particles are closely aggregated and there is the case where effective quantity of water flow cannot be obtained though fine precipitates in water can be removed.

For example, a ferromagnetic material may be generally used as the magnetic substance. Examples of the ferromagnetic material include iron, alloys containing iron, magnetite, titanic iron ore, magnetic pyrite, magnesia ferrite, cobalt ferrite, nickel ferrite, barium ferrite, and the like. Among these materials, ferrite type compounds superior in stability in water are more effective. For example, magnetite ($Fe_3O_4$) is not only inexpensive but also stable as a magnetic substance in water and is also a highly safe element, showing that it is easily used for water treatment. Magnetite is therefore preferable. Though the magnetic substance may take various forms such as a sphere, polyhedron or amorphous form, no particular limitation is imposed on the form of the magnetic substance. A preferable particle diameter and form of the magnetic substance in use may be properly selected from the viewpoint of, for example, production cost, and a spherical structure or polyhedral structure in which the corners are rounded is desirable as the form. These magnetic substances may be surface-treated by usual plating such as Cu plating or Ni-plating.

Also, as to the aggregates obtained by aggregation of magnetic particles of which a surface is coated with a polymer, primary particles having a core/shell structure constituted of a core of a magnetic substance and a shell of a polymer layer with which the surface of the core is coated are aggregated to form an aggregate.

As the polymer with which the surface of magnetic particles is coated and which aggregates these particles, a material appropriately corresponding to an object may be selected. A polyacrylonitrile, polymethylmethacrylate, polystyrene or copolymers of these compounds with which magnetic particles are easily coated and which have acid resistance and alkali resistance and phenol resins having high dispersibility in water and trialkoxysilane condensates which are strongly bonded with a magnetic substance and have high stability in water are preferably used. The magnetic particles are preferably coated with the polymer such that the average surface coating thickness t satisfies the equation $0.01 \leq t \leq 0.25$ μm. When the average surface coating thickness t is less than 0.01 μm, a secondary aggregate is reduced in strength, which sometimes offers a difficulty in use in water. When the average surface coating thickness t exceeds 0.25 μm on the other hand, clearances between particles are narrowed and there is the case where effective quantity of water flow cannot be secured when the polymer is used as the filter aid. The calculation of the amount of the polymer to be coated may be made by measuring based on the observation using an optical microscope, scanning electron microscope (SEM) or the like. It is however preferable that the temperature of the filter aid be raised to a high temperature in a non-oxygen atmosphere to thermally decompose it to thereby find a reduction in weight, that is, the amount of the polymer to be coated and then, the average thickness of the polymer layer is calculated from the specific surface of particle, thereby making it possible to find the amount of the polymer to be coated with high accuracy.

Also, when the filter aid comprises aggregates of magnetic particles coated with a polymer, this aggregate preferably has a specific form. Specifically, in the filter aid according to this embodiment, the average diameter D2 satisfies the equation $D1 < D2 \leq 20$ μm where D1 is the average diameter of magnetic particles. When the magnetic particles are aggregated in this size, particles are not aggregated into a fairly spherical form but are aggregated into a distorted form with irregularities on the surface thereof. The distorted aggregate brings about proper clearances in the filtered deposit when it is used as a filter aid or precoating material in membrane filtration treatment of water, thereby enabling a desired filtering throughput while trapping copper compound grains in the water. When the average diameter D2 of the aggregates 13 exceeds 20 μm, clearances between aggregates are large and there is the case where fine copper compound grains in water cannot be trapped. Moreover, the average diameter D2 more preferably satisfies the equation $D1 < D2 \leq 15$ μm. This is because copper compound grains in water are easily trapped by reducing the average diameter D2 of the aggregate to 15 μm or less.

There is no particular limitation to the filter aid according to the embodiment described herein insofar as it can attain the structure of the filter aid as mentioned above and the filter aid may be produced by any methods. As an example of such a method, the spray dry process is given in which a polymer is dissolved in an organic solvent which can dissolve the polymer and a magnetic substance is dispersed in this solution to prepare a composition, and this composition is sprayed to remove the organic solvent. According to this method, the average diameter D2 of secondary aggregates obtained by aggregation of primary particles can be adjusted and also, pores are formed when the organic solvent is removed from between aggregated primary particles, enabling the formation of an adequate porous structure with ease by controlling the environmental temperature of and spray speed of spray drying.

Industrially, on the other hand, a polymer solution obtained by dissolving a polymer in a solvent which can dissolve the polymer is prepared, the polymer solution is poured into a mold in such a manner that the surface of magnetic particles or their aggregate put in the mold is coated, further, the solvent is removed from the polymer solution to solidify the polymer and the solid material is crushed, whereby the filter aid can be produced. The filter aid can also be produced by crushing a material solidified by removing an organic solvent from a composition in which the magnetic substance is dispersed in a polymer solution. Also, the filter aid can be produced by dripping a composition prepared by dissolving a polymer in a solvent, in a Henschel mixer, ball mill or granulator and, followed by drying. At this time, a preferable filter aid can be produced if it is produced through a process having a process condition under which the surface of magnetic particles can be coated by the polymer solution and a process having a process condition under which these magnetic particles can be aggregated.

The following explanations are furnished as to a method of adjusting the polymer coating thickness and as to a method of adjusting the aggregate diameter of an aggregate obtained by aggregation of the polymer-coated magnetic particles, in the production of a filter aid.

In order to determine the coating thickness on the surface of the magnetic particles in the production, the coating thickness is calculated from the mixing ratio of the polymer to the magnetic particles, the density of a resin and the specific surface of the magnetic particles. Specifically, the volume of the resin to be added is found from the weight and density of the resin to be added and this volume is divided by the surface area of the magnetic particles calculated from the weight and specific surface of the magnetic particles to obtain the average coating thickness t of the polymer. Also, it is reasonable to decrease the diameters of liquid droplets which are spray-dried to decrease the size of the aggregate though the control of particle diameter depends on the type of solution to be sprayed and on spraying method. When, for example, the spray pressure of a spray nozzle is raised, or spray speed is decreased or the rotation speed of a spray disk is increased, the particle diameter of an aggregate to be produced is decreased.

Next, a method of measuring the coating thickness of the polymer in the already formed aggregate will be explained.

The calculation of the coating thickness of the polymer to be coated may be made by measuring based on the observation using an optical microscope or SEM. It is however preferable that a temperature be raised to high in a non-oxygen state to decompose the resin complex material to thereby find a reduction in weight, that is, the amount of the polymer to be coated and then, the average thickness of the polymer layer be calculated from the specific surface of particle, thereby making it possible to find the average thickness of the polymer layer to be coated with high accuracy.

(Copper Recovery Apparatus in a Second Embodiment)

A copper recovery apparatus 1A in a second embodiment will be explained with reference to FIG. 4. When parts in this embodiment are duplicated in the above embodiment, explanations of these parts are omitted.

A copper recovery apparatus 1A in the second embodiment is used in the body feed process and is effectively utilized particularly in the case where the concentration of copper compound grains precipitated in water is high. The copper recovery apparatus 1A of this embodiment is different from the apparatus 1 of the above first embodiment in the point that the apparatus 1A is not provided with the mixing tank 6 and is provided with a mixing/precipitation tank 2A in place of the precipitation tank 2. This mixing/precipitation tank 2A has both a precipitation function of precipitating copper compound grains by adding an alkali to the water and a mixing function of mixing the precipitated copper compound grains in the water with filter aid by adding the filter aid to the water. Specifically, in the copper recovery apparatus 1A of this embodiment, the filter aid is directly supplied to the mixing/precipitation tank 2A from the filter aid tank 5 through the line L6 without passing through the mixing tank.

(Copper Recovery Method of the Second Embodiment)

Next, the copper recovery method of the second embodiment using the above apparatus 1A will be explained with reference to FIG. 5 and FIG. 4.

Copper ion-containing water to be treated is introduced into the mixing/precipitation tank 2A and sodium hydroxide (NaOH) is added to the water to put the water into an alkali state to precipitate copper hydroxide grains from the water according to the above formula (1) in the mixing/precipitation tank 2A.

In the second embodiment, the filter aid and a dispersion medium are mixed to prepare a suspension. The dispersion medium used in this case is the water present in the mixing/precipitation tank 2A. The precipitated copper compound grains are preferably contained in the water. The filter aid is directly poured into the water to be treated in the mixing/precipitation tank 2A from the apparatus 5 and the copper compound grains and filter aid in the water are stirred and mixed by the stirring screw 21 to prepare a suspension from the water (step K1). The concentration of the filter aid in the suspension is adjusted to about 10000 to 200000 mg/L, though no particular limitation is imposed on it insofar as a deposit layer is formed by the following procedures.

Then, the suspension (water containing the filter aid and copper compound grains) is fed to the solid-liquid separator 3 from the mixing/precipitation tank 2A through the line L2 and is made to pass through the filter 33 to separate the filter aid and copper compound grains from the suspension by filtration, thereby depositing the filter aid and copper compound grains on the filter 33 to form a deposit layer constituted of the filter aid and copper compound grains (Step K2). The suspension is made to pass through the filter 33 under pressure.

The filter 33 is installed in such a manner as to close the intake port of the solid-liquid separator 3 so that a reduction in the pressure of the suspension in the solid-liquid separator 3 is reduced as much as possible to allow the filter 33 to undergo the filtering of the suspension.

Specifically, the upper space 31 defined by the container wall of the solid-liquid separator 3 and the filter 33 is decreased and a suspension is pressed with a high pressure in the space 31 having a small volume to thereby promote the filtering of the filter aid contained in the suspension. At this time, a liquid component of the suspension is made to rapidly pass through the filter 33 by the synergetic action of the pressure applied by driving the pressure pump P1 and gravitation and a solid component (filter aid and precipitated copper hydroxide grains) of the suspension is trapped by the filter 33, with the result that a deposit layer made of the filter aid and precipitated copper hydroxide grains (body feed deposit layer) is formed on the filter 33.

Then, the valve is switched to start the pump and the pump is driven to return a part or all of the treated water to the upper space 31 of the solid-liquid separator through the lines L3→L31. This treated water to be returned is used as detaching water that detach s the deposit layer from the filter 33. The treated water (detaching water) is blasted against the deposit layer from the side of the upper space 31 to detach the deposit layer from the filter 33 and the treated water is further blasted against the detached matters to decompose the detached matters into pieces, thereby dispersing the filter aid and copper compound grains in a dispersion medium (Step K3).

Then, the filter aid is recovered from the suspension after the deposit layer is decomposed by the magnetic separation method (Step K4).

An electromagnet 42 is turned ON to adsorb and secure the filter aid by the electromagnet 42 in the suspension. Then, the copper concentrated water is discharged to a reservoir (not shown) from the container of the separation tank 4 through the line L8. Then, the electromagnet 42 is turned OFF to make the filter aid fall away from the electromagnet 42, a part of the treated water is supplied to the container from the solid-liquid separator 3 through the line L32 to add the treated water to the fallen filter aid to make it into a slurry-like or suspension-like material, and this slurry-like or suspension-like filter aid is fed to the filter aid supply unit 5 from the separation tank 4 through the line L5. Or, after the filter aid is adsorbed and secured by the electromagnet 42, the filter aid together with the electromagnet 42 is transferred to other container, where the electromagnet 42 is turned OFF to thereby make the filter aid fall away from the electromagnet 42, thereby recovering the filter aid in the other container.

Thereafter, the recovered filter aid is supplied to the upper space 31 of the solid-liquid separator 3 from the filter aid supply unit 5 through the line L6 to reuse the recovered filter aid for forming the body feed deposit layer. The filter aid can be used repeatedly in the cycle of mixing with copper compound grains→formation of a deposit layer by body feed process→solid-liquid separation→recovery→mixing with copper compound grains.

In the copper recovery method of the second embodiment, the filter aid is supplied together with the water (suspension) containing copper compound grains to be separated and recovered because the filter aid constituting the body feed deposit layer is contained in the suspension prepared by utilizing the above water to be treated.

Therefore, because the precipitated copper compound grains and filter aid are supplied simultaneously even in the case where, particularly, the amount of the precipitated copper compound grains in the water to be treated (suspension) is large, excessively adsorbed precipitated copper compound grains never fill clearances between the filter aids like the above first embodiment. For this, a certain filtering rate can be kept for a long period of time. As a result, the copper recovery method of the second embodiment is effective when the concentration of copper compound grains precipitated in the wastewater is high.

Also, in any of the first and second recovery methods, copper compound grains to be recovered can be easily washed (cations removing treatment). Specifically, cations adsorbed to the copper compound grain can be removed by making water pass for a fixed time through the filter aid and copper compound grains deposited on the filter.

(Third Embodiment)

A third copper recovery apparatus 1B utilized in the pre-coating process will be explained with reference to FIG. 6. When parts in this embodiment are duplicated in the above embodiment, explanations of these parts are omitted.

In the copper recovery apparatus 1B of the third embodiment, two lines, that is, a washing water supply line L10 and a detaching water supply line L11, are communicated with the upper space 31 of the solid-liquid separator 3B to supply tap water. The washing water supply line L10 is communicated with the upper space 31 of the solid-liquid separator 3B and supplies tap water to the upper space 31 to remove ions of the copper compound contained in the deposit layer on the filter 33. An abundant amount of tap water is introduced into the upper space 31 of the solid-liquid separator through the washing water supply line L10 to remove cations (Na ions, Ca ions, and Mg ions) contained in the precoat layer with high efficiency.

The detaching water supply line L11 is communicated with a side of the upper space 31 of the solid-liquid separator 3B and tap water is supplied to the upper space 31 from the side to detach and remove the precoat layer from the filter 33. Tap water having sufficient amount and pressure is introduced into the upper space 31 of the solid-liquid separator 3B from the side through the detaching water supply line L11 to thereby detach off the precoat layer with the water pressure from the filter 33 and to decompose the precoat layer into pieces. If, in this case, an injection nozzle is attached to the connecting part of the detaching water supply line L11 and the solid-liquid separator 3B to inject detaching water forcedly from the nozzle, the effect of detaching the precoat layer from the filter is improved, leading to improved knocking efficiency.

EXAMPLES

The present invention will be explained in more detail by way of examples.

(Preparation of a Filter Aid)

The following six filter aids A to F were prepared as the filter aid used in the above water treating method.

(Filter Aid A)

Magnetite particles (average diameter: 2 μm) were prepared.

(Filter Aid B)

Magnetite particles (average diameter: 0.5 μm) were prepared.

(Filter Aid C)

Magnetite particles (average diameter: 5 μm) were prepared.

(Filter Aid D)

30 parts by weight of a polymethylmethacrylate was dissolved in 3 L of tetrahydrofuran to prepare a solution, and 300 parts by weight of magnetite particles having an average diameter D1 of 2 μm was dispersed in the solution to obtain a composition. This composition was sprayed slowly by using a mini-spray drier (trade name: B-290 model, manufactured by Sibata Scientific Technology Ltd.) to produce a filter aid which was aggregated into a spherical form and had an average diameter (average secondary aggregates diameter) D2 of about 11 μm. The average coating thickness t was 0.038 μm.

(Filter Aid E)

30 parts by weight of a polymethylmethacrylate was dissolved in 3 liters of tetrahydrofuran to prepare a solution, and 300 parts by weight of magnetite particles having an average diameter of 2 μm (A) was dispersed in the solution to obtain a composition. This composition was sprayed slowly by using a mini-spray drier (trade name: B-290 model, manufactured by Sibata Scientific Technology Ltd.) to produce a filter aid which was aggregated into a spherical form and had an average secondary aggregate diameter D2 of about 18 μm. The average coating thickness t was 0.038 μm (C).

(Filter Aid F)

40 parts by weight of a resole type phenol resin was dissolved in 3 liters of water to prepare a solution, and 300 parts by weight of magnetite particles (specific surface: 2.5 $m^2/g$) having an average aggregate diameter of 2 μm (A) was dispersed in the solution to obtain a composition. This composition was sprayed slowly by using a mini-spray drier (trade name: B-290 model, manufactured by Sibata Scientific Technology Ltd.) to produce a filter aid which was aggregated into a spherical form and had an average secondary aggregates diameter of about 11 μm. The average coating thickness t calculated from the density of the polyphenol resin and specific surface of the magnetite was 0.044 μm (C).

Example 1

An apparatus 1 schematically shown in FIG. 1 was manufactured. Water (water to be treated) containing copper is supplied to a precipitation tank 2 and an aqueous sodium hydroxide solution (written as NaOH in the drawing) is added to the precipitation tank to put the solution into an alkali state to precipitate copper hydroxide. Also, a filter aid is fed to a mixing tank 6 from a filter aid tank 5 and is mixed with treated water a part of which is reused to prepare a filter aid slurry. This filter aid slurry is first fed to an upper space 31 of a solid-liquid separator 3 to form a film of the filter aid on a filter 33. Then, the water with copper precipitated therein is supplied under pressure to the solid-liquid separator 3 and subjected to solid-liquid separation (filtration) using a filter aid film formed in advance. The filtrate is a weak alkali treated solution from which copper is removed. Although the filtrate may be discharged through a neutralizing tank, it may be used as detaching water that detach s the deposit layer from the filter 33 of the solid-liquid separator, as washing water that washes away the filter aid from a magnet 42 of the separation tank, or as a diluting solvent used when the filter aid slurry is produced in the mixing tank 6. When the filtration of the water to be treated is finished, a cake of filter aid and precipitated copper compound grains exist on the filter 33 in the solid-liquid separator 3. In order to wash the cake, washing water is supplied from the side of the filter 33 to destroy the cake, which is then fed to the separation tank 4. The separation tank 4 is provided with a stirring screw 41 and an electromagnet 42 (magnetic separation mechanism) to separate the filter aid and copper compound grains with stirring and to separate only the filter aid by the magnet to recover it. The solution with the recovered filter aid is recovered as copper concentrated water containing a high concentration of copper compound grains, washed with supplied washing water and returned to the filter aid tank 5. The filter aid returned in this manner is supplied to the mixing tank 6 and reused.

As the water to be treated, an aqueous solution containing copper sulfate in an amount of 50 mg/L based on copper was prepared. This water was supplied to the precipitation tank 2, 48% sodium hydroxide was added dropwise to the solution to adjust the solution to pH 10. When these compounds were mixed for a while, precipitation of a mixture salt (copper) compound of copper hydroxide and copper sulfate containing primarily copper hydroxide having a pale green color was confirmed.

Also, the filter aid is supplied to the mixing tank 6 from the filter aid tank 5 filled with the filter aid A and water was mixed with the filter aid to manufacture a filter aid slurry. This slurry was supplied to the solid-liquid separator 3 to form a filter aid layer having about 1 mm in average thickness on the filter 33. Thereafter, the water to be treated was supplied to the solid-liquid separator 3 from the precipitation tank 2 to carry out filtration, and it was confirmed that 99% or more of copper in the filtrate (treated water) was recovered. After the filtering treatment, washing water was supplied from the side of the filter 33 of the solid-liquid separator 3 to break the layer formed on the filter 33 to supply the solution to the separation tank 4. After a stirrer in the separation tank 4 was operated to separate the filter aid and copper compound and then, the electromagnet 42 was made to operate to thereby separate only the filter aid, followed by discharging a liquid to obtain a copper concentrated solution. The copper concentrated solution was analyzed, and it was confirmed that the major component of the slurry was a mixture salt compound of copper hydroxide and copper sulfate containing primarily copper hydroxide. After that, the magnetic field of the electromagnet 42 was released, and washing water was supplied to prepare a filter aid slurry and then, the filter aid slurry was returned to the filter aid tank 5. After that, the slurry was supplied to the mixing tank 6 to carry out the same operation as above, with the result that the recovered filter aid was reused without having any problems.

Example 2

Using the same apparatus as that used in Example 1, the same test as that in Example 1 was made except that the filter aid B was used in place of the filter aid A. The copper recovery rate was 99% or more. Although the water flow rate in the solid-liquid separator was almost one-half that in Example 1, the operation could be performed without having any problems.

Example 3

Using the same apparatus as that used in Example 1, the same test as that in Example 1 was made except that the filter aid C was used in place of the filter aid A. The copper recovery rate was 99% or more. Although the water flow rate in the solid-liquid separator was almost twice that in Example 1, the operation could be performed without having any problems.

Comparative Example 1

Using the same apparatus as that used in Example 1, the same test as that in Example 1 was made except that magnetite particles having an average particle diameter of 0.3 μm was used in place of the filter aid A. A filtering operation was performed. However, the filter was clogged and therefore, sufficient filtering rate could not be obtained.

Example 4

An apparatus 1A schematically shown in FIG. 4 was manufactured. Water (water to be treated) containing copper is supplied to a mixing/precipitation 2A and an aqueous sodium hydroxide solution (written as NaOH in the drawing) is added to the mixing/precipitation 2A to put the solution into an alkaline state to precipitate copper hydroxide. A filter aid is also fed to the mixing/precipitation tank 2A from a filter aid tank 5 to prepare a mixture slurry of a copper precipitate and the filter aid. This filter aid slurry is first fed to a solid-liquid separator 3 to form a film of the filter aid on a filter 33 and, at the same time, the copper compound is removed. The filtrate is a weak alkali treated solution from which copper is removed. Although the filtrate may be discharged through a neutralizing tank, it may be used as washing water in the solid-liquid separator 3 or as washing water for an electromagnet 42 in a separation tank 4. When the filtration of the water to be treated is finished, a cake of filter aid and precipitated copper compound grains exist on the filter 33 in the solid-liquid separator 3. In order to wash the cake, washing water is supplied from the side of the filter 33 to destroy the cake, which is then fed to the separation tank 4. The separation tank 4 is provided with a stirring screw 41 and an electromagnet 42 (magnetic separation mechanism) to separate the filter aid and copper compound with mixing thereby separating only the filter aid by the magnet to recover it. The solution with the recovered filter aid is recovered as copper concentrated water containing a high concentration of copper compound, detached from the filter by the supplied detaching water (washing water) and returned to the filter aid tank 5. The returned filter aid in this manner is supplied to the mixing/precipitation tank 2A and reused.

As the water to be treated, an aqueous solution containing copper sulfate in an amount of 1000 mg/L based on copper was prepared. This water was supplied to the mixing/precipitation tank 2A, 48% sodium hydroxide was further added dropwise to the solution to adjust the solution to pH 10. When these compounds were mixed for a while, precipitation of a mixture salt (copper compound) of copper hydroxide and copper sulfate containing primarily copper hydroxide having a pale green color was confirmed. Also, the filter aid was supplied in an amount of 10000 mg/L to the mixing/precipitation tank 2A from the filter aid tank 5 filled with the filter aid A to manufacture a slurry of the filter aid and precipitated copper compound grains. This slurry was supplied to the solid-liquid separator 3 to carry out filtration on the filter 33, and it was confirmed that 99% or more of copper in the filtrate (treated water) was recovered. After the filtering treatment, detaching water was blasted against the deposit layer from the side of the filter 33 of the solid-liquid separator 3 to detach the deposit layer from the filter 33 and to break the detached matter into pieces. Then, the detached matter was discharged together with the detaching water to the separation tank 4 from the solid-liquid separator 3. In the separation tank 4, the detached matter discharged water was stirred by the stirring screw 41 to disperse the filter aid and copper compound grains in a dispersion medium. Then, the electromagnet 42 was made to operate to thereby make the electromagnet 42 adsorb the filter aid, thereby separating the filter aid from the solution. Copper compound grains were left in this solution by this magnetic separation to thereby obtain a copper concentrated solution containing copper compound grains. The copper concentrated solution was analyzed, and it was confirmed that the major component of the slurry was a mixture salt compound of copper hydroxide and copper sulfate containing primarily copper hydroxide. After that, the magnetic field of the electromagnet 42 was released, and washing water was supplied to prepare the filter aid slurry and then, the filter aid slurry was returned to the filter aid tank 5. After that, the slurry was supplied to the mixing/precipitation tank 2A to carry out the same operation as above, with the result that the recovered filter aid was reused without having any problems.

Example 5

Using the same apparatus 1A as that used in Example 4, the same test as that in Example 4 was, made except that the filter aid D was used in place of the filter aid A. The copper recovery rate was 99% or more. Although the water flow rate in the solid-liquid separator was almost 1.3 times that in Example 4, the operation could be performed without having any problems.

Example 6

Using the same apparatus 1A as that used in Example 4, the same test as that in Example 4 was made except that the filter aid E was used in place of the filter aid A. The copper recovery rate was 99% or more. Although the water flow rate in the solid-liquid separator was almost twice that in Example 4, the operation could be performed without having any problems.

Example 7

Using the same apparatus 1A as that used in Example 4, the same test as that in Example 4 was made except that the filter aid E was used in place of the filter aid A. The copper recovery rate was 99% or more. Although the water flow rate in the solid-liquid separator was almost 1.2 times that in Example 4, the operation could be performed without having any problems.

Example 8

An apparatus 1B schematically shown in FIG. 3 was manufactured. This apparatus 1B is different from the apparatus 1 of FIG. 1 in the point that a city water (water works) intake port communicated with a second washing water supply line L10 is set to the upper part of the upper space 31 of the solid-liquid separator 3B to supply tap water for desalting after the solid-liquid separation operation. Also, a tap water intake port communicated with the detaching water supply line L11 is set to the side of the upper space 31 of the solid-liquid separator 3B to also wash the filter inside the solid-liquid separator with tap water.

As the water to be treated, an aqueous solution containing copper sulfate in an amount of 50 mg/L based on copper was prepared. This water to be treated was supplied to precipitation tank 2, 48% sodium hydroxide was added dropwise to the solution to adjust the solution to pH 10. When these compounds were mixed for a while, precipitation of a mixture salt (copper compound) of copper hydroxide and copper sulfate containing primarily copper hydroxide having a pale green color was confirmed. Also, the filter aid A was supplied to the mixing tank 6 from the filter aid tank 5 and water was mixed with the filter aid A to manufacture a slurry of the filter aid. This filter aid slurry was supplied to the solid-liquid separator 3 to produce the precoat layer of the filter aid having an average thickness of 1 mm on the filter 33. Then, the water was supplied to the solid-liquid separator 3 from the precipitation tank 2 to carry out filtration, and it was confirmed that 99% or more of copper in the filtrate was recovered. After the filtering treatment, the water was changed to tap water to allow the tap water to continue flowing, thereby removing cations in the copper compound contained in the precoat layer. After that, tap water was supplied from the side of the filter 33 of the solid-liquid separator 3 to destroy the layer formed on the filter 33 and the water containing the destroyed layer was supplied to the separation tank 4. A stirrer in the separation tank 4 was made to work to thereby separate the filter aid and copper compound, and then, the magnet 41 was made to work to separate only the filter aid, and the liquid was discharged to obtain a copper concentrated solution. The copper concentrated solution was analyzed, and it was confirmed that the major component of the slurry was a mixture salt compound of copper hydroxide and copper sulfate containing primarily copper hydroxide. After that, the magnetic field of the electromagnet 42 was released to make the filter aid fall away from the electromagnet 42, and washing water was supplied to the fallen filter aid to make a filter aid slurry. This filter aid slurry was returned to the filter aid tank 5 through a return line L6. After that, the slurry was supplied to the mixing tank 6 to carry out the same operation as above, with the result that the recovered filter aid was reused without having any problems.

According to the aforementioned embodiments, fine copper grains precipitated in water are prevented from flowing out of the system, which ensures that copper recovery rate can be increased and the amount of waste material generated by the recovery of copper can be decreased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A copper recovery apparatus, comprising:
(a) a mixing/precipitation tank configured to render water to be treated containing copper ions alkaline to precipitate copper hydroxide grains in the water and to produce a suspension by mixing a filter aid constituted of single particles comprising a magnetic substance or aggregates of the particles and having an average diameter of 0.5 μm to 20 μm with the water containing the precipitated copper hydroxide grains;
(b) a filter aid supply unit configured to supply the filter aid to the mixing/precipitation tank;
(c) a solid-liquid separator provided with a filter dividing the inside space thereof into an upper space and a lower space;
(d) a suspension supply line configured to supply the suspension from the mixing/precipitation tank to the upper space of the solid-liquid separator, the suspension being filtered by the filter, to form a deposit layer containing the filter aid and the copper hydroxide grains on the filter;
(e) a detaching water supply line configured to supply a detaching water that detaches the deposit layer from the filter, to the upper space of the solid-liquid separator to make the detaching water to detach the deposit layer from the filter;

(f) a separation tank configured to receive the detached matter of the deposit layer discharged together with the detaching water from the upper space of the solid-liquid separator, and magnetically separate the copper hydroxide grains and the filter aid contained in the detached matter;

(g) a copper recovery line configured to discharge and recover the detaching water containing the separated copper hydroxide grains from the separation tank; and (h) a filter aid return line configured to return the separated filter aid to the filter aid supply unit from the separation tank.

2. The apparatus according to claim 1, wherein the filter aid is constituted of aggregates of magnetic particles each of which surfaces is coated with a polymer, the average diameter D1 of the magnetic particles is within a range of 0.5 μm to 20 μm, the average diameter D2 of the aggregates satisfies the equation $D1<D2\leq 20$ μm and the average coating thickness t of the polymer satisfies the equation $0.01\leq t\leq 0.25$ μm.

3. A copper recovery method, comprising:

(a) rendering water to be treated containing copper ions alkaline to precipitate copper hydroxide grains in the water;

(b) mixing a filter aid constituted of single particles comprising a magnetic substance or aggregates of the particles and having an average diameter of 0.5 to 20 μm, with a dispersion medium to produce a suspension of the filter aid in the dispersion medium;

(c) filtering the suspension by a filter, thereby forming a precoat layer formed of the filter aid on the filter;

(d) supplying the water containing the copper hydroxide grains on the filter to pass the water through the precoat layer and the filter, thereby trapping the copper hydroxide grains contained in the water by the precoat layer;

(e) supplying a detaching water that detaches the precoat layer trapping the copper hydroxide grains from the filter, to the precoat layer on the filter, to detach the precoat layer trapping the copper hydroxide grains from the filter by the detaching water, thereby to provide a mixture of the detached matter of the precoat layer and the detaching water;

(f) magnetically separating the filter aid from the copper hydroxide grains in the mixture; and (g) recovering the detaching water containing the separated copper hydroxide grains, and reusing the separated the filter aid in the mixing of the filter aid with the dispersion medium.

4. A copper recovery method, comprising:

(i) rendering water to be treated containing copper ions alkaline to precipitate copper hydroxide grains in the water;

(ii) mixing a filter aid constituted of single particles comprising a magnetic substance or aggregates of the particles and having an average diameter of 0.5 μm to 20 μm, with the water to produce a suspension of the filter aid and the copper hydroxide grains in the dispersion medium;

(iii) filtering the suspension by a filter to form a deposit layer containing the filter aid and the copper hydroxide grains on the filter;

(iv) supplying a detaching water that detaches the deposit layer from the filter, to the deposit layer on the filter, to detach the deposit layer from the filter by the detaching water, thereby to provide a mixture of detached matter of the deposit layer and the detaching water;

(v) magnetically separating the filter aid from the copper hydroxide grains in the mixture; and (vi) recovering the detaching water containing the separated copper hydroxide grains, and reusing the separated filter aid in the mixing of the filter aid with the water.

* * * * *